Aug. 20, 1929.   A. C. CASTRIOTIS   1,725,340
DETACHABLE ANTIGLARE SHIELD FOR HEADGEAR
Filed March 29, 1926   2 Sheets-Sheet 1

Aug. 20, 1929. A. C. CASTRIOTIS 1,725,340
DETACHABLE ANTIGLARE SHIELD FOR HEADGEAR
Filed March 29, 1926 2 Sheets-Sheet 2
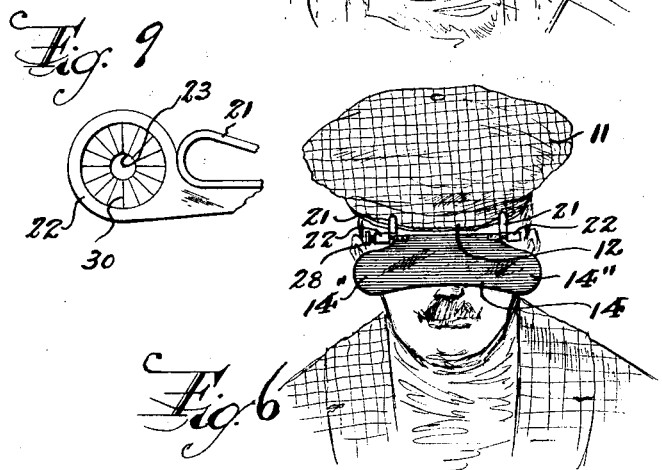
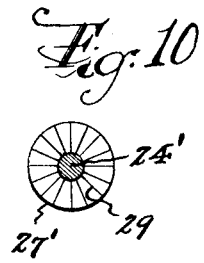
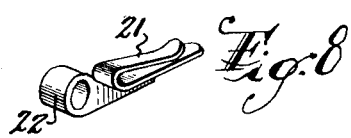
INVENTOR
A. C. Castriotis
BY
Frantzel and Richards
ATTORNEYS Patented Aug. 20, 1929.

1,725,340

UNITED STATES PATENT OFFICE.

ALEXANDER C. CASTRIOTIS, OF NEW YORK, N. Y.

DETACHABLE ANTIGLARE SHIELD FOR HEADGEAR.

Application filed March 29, 1926. Serial No. 98,096.

This invention relates, generally, to improvements in anti-glare devices suitable for attachment to headgear worn by drivers of motor vehicles, and adapted to shield the eyes of the wearer from the glare of sunlight and from the headlights of approaching vehicles.

This invention has for its principal or general object to provide a novel form and arrangement of eye-shield made of a transparent material suitably colored or tinted to diminish the intensity of bright light rays without necessarily impeding all vision, in combination with a simple and easily applied adjustable supporting means for detachably connecting the shield to the visor of a cap for interposition between the eyes of the wearer and the source of light glare.

This invention has for a more specific object to provide a novel shape and supported arrangement of eye-shield member which is especially designed to provide desirable advantages when worn by the drivers of automobiles during night driving, at which time the blinding effects of glare from the headlights of approaching automobiles and the like is more or less constantly encountered; and in this connection I provide a novel shape of eye-shield element so related to the supporting means for attaching the same to the driver's cap that it both assures adequately shielded vision to the left of the driver from which direction the headlight glare of the approaching vehicles proceeds, but at the same time permits of unimpeded vision to the right of the driver, whereby clear sight by the driver of the right-hand side of the road is at all times possible.

A further object of this invention is to provide a simple and effective means for both detachably and adjustably coupling the eye-shield element to the driver's cap; said means also permitting interchangeable attachment of the eye-shield element itself therewith.

Other objects of this invention not at this time more particularly enumerated, will be clearly understood from the following detailed description of the same.

The invention is clearly illustrated in the accompanying drawings, in which

Figure 1 is a perspective view showing the novel anti-glare device attached to the cap of the vehicle driver, and equipped with the novel form of eye-shield especially adapted for night driving; Figure 2 is a front elevation of said form of anti-glare device, drawn on an enlarged scale; Figure 3 is a fragmentary side or end elevation of the same; and Figure 4 is a perspective view of a portion of the detachable eye-shield supporting and attaching means, with the parts thereof disassembled.

Figure 5 is a perspective view showing the novel anti-glare device attached to the cap of the vehicle driver, and equipped with a modified form of anti-glare element, more especially suitable as a sun glare shield.

Figure 6 is a perspective view showing a modified construction of eye-shield element adjustable supporting and attaching means in connection with the cap of the vehicle driver; Figure 7 is in part a plan view and part sectional view of said modified construction of said eye-shield element adjustable supporting and attaching means; Figure 8 is a detail perspective of an attachment clip of the same; Figure 9 is an enlarged fragmentary end view of an attachment clip, showing the bearing member with its radially toothed or serrated internal end structure; and Figure 10 is an enlarged fragmentary sectional view of the journal element of the attachment clip, showing the radially toothed or serrated end structure of the adjustment therefor.

Similar characters of reference are employed in all of the hereinabove described views, to indicate corresponding parts.

Referring now to Figures 1 to 4 inclusive of the said drawings, the reference character 11 indicates a cap having a visor 12, such, for example, as the so-called golf-cap, and which is a very common style of headgear worn by motorists and especially by motor vehicle drivers. Such a cap is an ideal form of headgear with which my novel anti-glare device may be attached, but it will be understood that other forms of headgear having projecting brims may also be utilized to receive the attachment of my novel anti-glaring device.

In its simplest form, the detachable means for adjustably supporting and attaching an eye-shield element to the cap visor 12, or other hat brim, comprises a pair of substantially U-shaped clips 13, the arms of which are resiliently separable to receive the body of an eye-shield element 14. The lower arm 13' is preferably straight, while the upper arm 13" preferably has its body convergent to said lower arm; the free end of said upper arm being slightly upturned to provide a divergent lip 13'''. Said lower arm 13' is provided at one side with a longitudinal integral flange 15 disposed substantially at right angles to the plane of said lower arm, said flange terminating, adjacent to the elbow of the clip 13 in a perforate ear or bearing member 16 in the plane of said flange. Connected with each U-shaped clip 13 is another similar U-shaped clip 17, the arms of which are resiliently separable to embrace the body of the cap visor 12. The lower arm 17' is preferably straight, while the upper arm 17'' preferably has its body convergent to said lower arm; the free end of said upper arm being slightly upturned to provide a divergent lip 17'''. Said lower arm 17' is provided at one side with a longitudinal integral flange 18 disposed substantially at right angles to the plane of said lower arm, said flange terminating, adjacent to the elbow of the clip 17 in a perforate ear or bearing member 18' in the plane of said flange.

A clip 13 and a clip 17 are pivotally interconnected together to respectively extend in opposite directions, by registering their respective perforate ears or bearing members 16 and 18' together, the same being secured in such relation by a pivotal rivet 19 passed therethrough. By virtue of such pivotal connection the clip 13 may be swung in vertical plane relative to the clip 17 to thereby adjust the angle of projection of the eye-shield element 14 which is supported by the clips 13. In order to provide a frictional action calculated to retain the clips 13 in any position to which the same may have been adjusted relative to the clips 17, I interpose a frictional element 20 between the meeting faces of said perforate ears 16 and 18', said element preferably being in the form of a helical split washer, as shown more particularly in Figure 4 of the drawings.

To operatively relate the eye-shield element 14 to the clips 13, the latter are respectively engaged over the rear marginal portions of the former adjacent to its respective ends to yieldably clamp upon the same. To operatively connect the device with the cap visor 12, the latter is inserted in the clips 17 which yieldably clamp upon said visor.

It will be apparent that the clip coupling and supporting means provided by the above described arrangement permits of easy attachment and detachment of the eye-shield element 14 therefrom, so that various specific forms of eye-shield elements may be employed at the will of the user.

In the drawings, I have shown two specific forms of eye-shield elements 14. In Figures 1 and 2 I have illustrated a novel form of eye-shield element peculiarly adapted for night driving, the same comprising a sheet of transparent or translucent material suitably tinted or colored to obstruct or diminish intensity of bright light rays, the same being cutaway at its inner or right hand end to provide a substantially oblique and preferably arcuate end margin 14', inclining downwardly from right to left and from the rear to the forward edge of the element 14. The outer or left end of said element 14 may be provided with an outwardly and downwardly projected lobe 14''. When attached to the cap 11 of the vehicle driver, this form of eye-shield element 14 is so arranged, that the driver's eyes are adequately protected from glare proceeding from the left hand side, at which side the approaching vehicles pass, the headlights of which produce the blinding glares desired to be avoided, since the eye-shield is laterally pitched to the left, so that as the driver glances in such direction the vision of both eyes will be shielded by the interposed eye-shield body, but when the driver glances to the right, the line of vision of the eyes will pass beyond the oblique margin 14', so that the eye-shield is not interposed, and consequently a clear vision of the right hand side of the road on which the vehicle is driven is obtained. The clearness of vision to the right, thus permitted, is enhanced by reason of the fact that the shield element intercepts bright light rays coming from the left and tending to intersect the line of vision with disturbing effect.

In Figures 5 and 6 I have shown the usual form of eye-shield element 14, which possesses outwardly and downwardly projected lobes 14'' at both ends. This type of eye-shield element is suitable for use against sun-glare, but is not equal in advantage for night use, since it does not permit of that clear uninterrupted vision to the right so essential to safety and comfort under night driving conditions.

It will be understood that my novel form and arrangement of attaching and supporting clip means permits of interchangeable use of either of the specific forms of eye-shield elements hereinabove described.

It will also be understood that angular adjustment, i. e. adjustment of the angle of inclination of the eye-shield member, may be easily attained by turning the same up or down as may be desired, the relative stiffness of the eye-shield element easily causing both clips 13 to turn in relation to the clips 17, whether the shield is manipulated by the left or right hand of the wearer, while the friction elements 20 will cause the clips 13 to retain the adjusted position to which they have been moved.

Referring now to Figures 6 to 10 inclusive of the drawings, I have shown therein a modified form of attaching and supporting means, in non-detachable but nevertheless adjustable relation to the eye-shield element 14. This form of attaching and supporting means comprises U-shaped clips 21 to frictionally engage the cap visor 12 or other hat brim. Suitably connected with the closed end or elbow of each clip 21 is a laterally disposed cylindrical socket 22. Each socket 22 possesses a closed end having a central opening 23 to provide a bearing for a rotatable journal arm 24. The inner end of each journal arm 24 terminates in a flattened portion 25, which are respectively secured by rivets 26 or other suitable fastening means to the respective ends of the eye-shield element 14 at points adjacent to the rearward edge of the same. One of the journal arms 24 is provided with a diametrically enlarged shoulder or collar 27 both rotatable and slidable in the socket 22 of one clip, and the other journal arm 24 is likewise provided with a similar enlarged shoulder or collar 27' both rotatable and slidable in the socket 22 of the other clip, but the latter journal arm has an extension 24' projecting beyond the outer closed end of the socket 22, the same terminating in an enlarged head or finger piece 28. The inner face of said shoulder or collar 27' is provided with radial teeth or serrations 29 to engage with similar radial teeth or serrations 30 provided on the inner side of the end wall of said socket 22 in which the same is engaged. A compression spring 31 is arranged around said extension 24' between the closed end of the socket and said finger piece 28. This spring 31 tends to produce longitudinal thrust on the journal 24 and its collar 27' to hold the serrations 29 of the latter engaged with the serrations 30 of the socket 22, thus retaining the eye-shield element 14 in any angular disposition to which it may have been turned. To adjust the inclination of said eye-shield element 14, the operator merely pushes inwardly on the finger-piece 28 against the tension of the spring 31, which movement releases the serrated collar 27' from the serrated socket 22, whereupon the finger-piece 28 can be turned in either direction to produce such angular adjustment of the eye-shield element 14 as may be desired, all of which will be readily understood from an inspection of Figure 7 of the drawings.

Having thus described my invention, I claim:—

1. In a device of the kind described, an eye-shield element having at its rear adjacent to each end thereof frictional unitary U-shaped clips to clamp upon a projecting brim portion of an article of headgear, supporting devices connecting said eye-shield element to said clips, said eye-shield element having, at that end thereof which is toward the right of the wearer, an in-curved arcuate end edge portion inclined downwardly and toward the opposite end thereof to permit unobstructed clear vision to the right of the wearer, and said opposite end terminating in an outwardly and downwardly directed lobe to shield vision to the left of the wearer.

2. In a device of the kind described, a pair of substantially U-shaped frictional clips adapted to detachably clamp upon a projecting brim portion of an article of headgear in laterally spaced apart relation, an eye-shield element having at its left side an outwardly and downwardly directed lobe to shield vision to the left of the wearer, a pair of supporting devices connected upon the rear marginal portions of said eye-shield element respectively adjacent to the ends thereof, means for pivotally interconnecting corresponding members of said respective pairs of clips and supporting devices together, and frictional elements combined with said pivotal connections for the purposes described.

3. In a device of the kind described, a pair of substantially U-shaped clips adapted to detachably clamp upon a projecting brim portion of an article of headgear in laterally spaced apart relation, each clip having at its closed end a perforate ear projecting therefrom at right angles to the horizontal plane thereof, an eye-shield element, a pair of supporting devices to carry said eye-shield element, said supporting devices each also having a perforate ear projecting therefrom at right angles to the horizontal plane thereof, said perforate ears of corresponding members of said clips and supporting devices being registered together, a fastening means extending through and pivotally securing together each set of thus registered perforate ears, frictional means intermediate said cooperating perforate ears to hold the same in relatively adjusted positions to selectively determine the angle of projection of said eye-shield element from said headgear brim.

In testimony, That I claim the invention set forth above I have hereunto set my hand this 26th day of March 1926.

ALEXANDER C. CASTRIOTIS.